Dec. 10, 1946. C. BRUNKHURST 2,412,203

PRESERVATION OF MILK PRODUCTS

Filed April 27, 1943

INVENTOR.
Charles Brunkhurst
BY
Harold F. Wilhelm
ATTORNEY

Patented Dec. 10, 1946

2,412,203

UNITED STATES PATENT OFFICE 2,412,203

PRESERVATION OF MILK PRODUCTS

Charles Brunkhurst, Middletown, N. Y.

Application April 27, 1943, Serial No. 484,716

4 Claims. (Cl. 99—192)

The invention relates to the preservation of milk products and more particularly to obtaining a satisfactory reconstituted whole milk.

At the present time, the common practices for obtaining a reconstituted whole milk are to add water to preserved evaporated whole milk or to milk powder. Such reconstituted whole milk is generally unsatisfactory. Either the reconstituted milk has a poor appearance or it lacks flavor, generally both. Attempts have been made to improve the quality of the reconstituted whole milk either by freezing fresh whole milk in its original state or by freezing evaporated milk. Freezing of the fresh whole milk in its original state is, of course, open to the additional objection of having too much bulk for storage purposes. In all cases the whole milk available for drinking is defective in both appearance and taste. Either the fats and solids separate out, or the milk has a brownish color, or it has a flat, tinny, caramel, burnt or other unpleasant taste.

An important feature of the present invention is the manufacture of a frozen concentrated whole milk product which, when water is added, will be so like the original fresh whole milk in consistency, appearance and taste that it would be difficult, if not impossible, for anyone to tell the difference.

According to a preferred embodiment of the invention, the whole unpasteurized milk, as it is obtained from the farmer, is subjected to a cream separating process for separating the cream from the skim milk. The skim milk is then suitably concentrated in a hot water-air blow type concentrator to reduce the water content. The cream is separately pasteurized, after which the concentrated skim milk and cream is re-mixed. The mixture is then homogenized, while hot, to break up the fats and solids, to insure thorough emulsification. The mixture is then subjected in diffused form to quick freezing to freeze the mixture whence it may be formed into frozen cakes for shipment to the trade in the same manner as any frozen food product. The cakes may be formed in suitable size to which the consumer adds water to form the reconstituted whole milk.

The invention also consists in certain new and original features and combinations hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which Fig. 1 illustrates diagrammatically one form of apparatus for the quick freezing step, using rotating drums;

Figure 1:
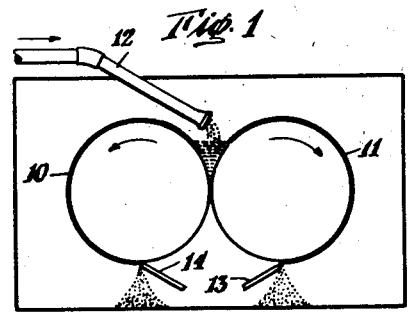

In the following description and in the claims, various details will be identified by specific names for convenience, but they are intended to be as generic in their application as the art will permit.

In the drawing accompanying and forming part of this specification, certain specific disclosure of the invention is made for purposes of explanation, but it will be understood that the details may be modified in various respect without departure from the broad aspect of the invention.

Referring now to the drawing, the apparatus for carrying out the quick freezing step will first be described. In Fig. 1 a pair of rotating horizontal hollow cylinders 10 and 11 are rotatably mounted, these cylinders having smooth surfaces and being in direct contact. They are suitably geared together and rotated in the direction of the arrows. The apparatus illustrated in Fig. 1 is similar in principle to machines now on the market, known as "Flake-Ice" or "Pak-Ice," used for making artificial ice. Scrapers 13 and 14 engage the drums to scrape off the mix freezing on the drums, the mix being fed through pipe 12 as indicated.

Figure 2:
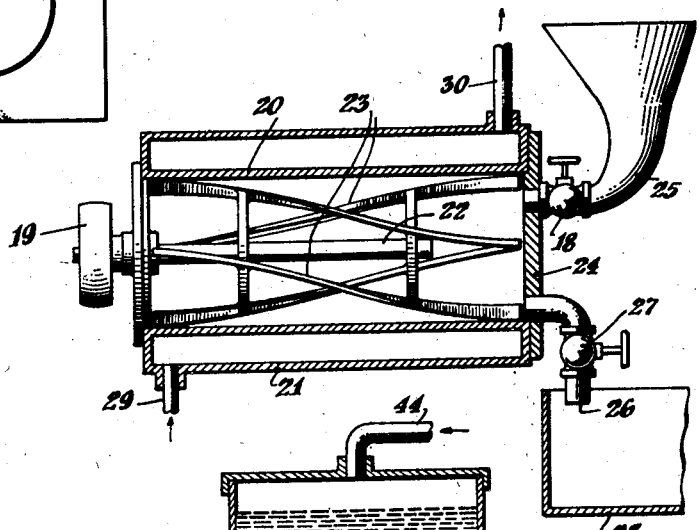
Fig. 2 illustrates diagrammatically another form of apparatus for quick freezing the concentrated milk and cream in batches.

Referring now to Fig. 2, a batch-type quick freezing apparatus is diagrammatically illustrated. This device comprises a cylinder 20 having a suitable cooling jacket 21. Rotatably mounted within the cylinder is a shaft 22 carrying a drive pulley 19 and helical blades 23 similar in shape to lawn mower blades and closely fitting the walls of the cylinder. A removable head 24 is suitably clamped on to the cylinder, this cylinder carrying a feed hopper 25 having feed valve 18 and a discharge pipe 26 having a discharge valve 27. A receptacle 28 is illustrated for receiving the frozen mix. A refrigerating medium, such as refrigerated brine or ammonia, is circulated through the jacket 21 in the direction of the arrows through pipes 29 and 30, as will be understood by those skilled in the art.

Figure 3:
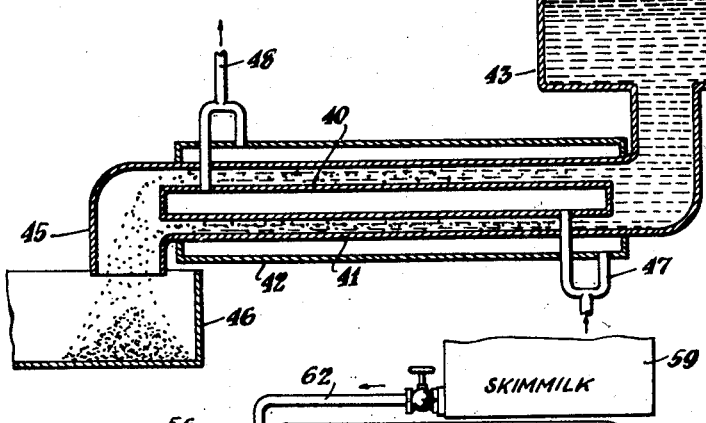
Fig. 3 illustrates diagrammatically another form of apparatus for quick freezing the concentrated milk and cream in a continuous process.

Referring now to Fig. 3, a continuous type quick freezing apparatus is shown diagrammatically. This device comprises concentric tubes, the inner tube being indicated by 40 and the outer tube by 41. A refrigerating jacket 42 surrounds the outer tube. The space between tubes 40 and 41 communicates with a feed hopper 43 having a removable cover and having a pipe 44 connected to a suitable source of compressed air (not shown). The space between tubes 40 and 41 also communicates with a discharge conduit 45 discharging into a receptacle 46. A branched feed pipe 47 supplies refrigerant, such as brine or ammonia, to the jacket 42 and to the inside of pipe 40 and a branched outlet pipe 48 carries away the refrigerant, as will be understood by those skilled in the art.

Figure 4:
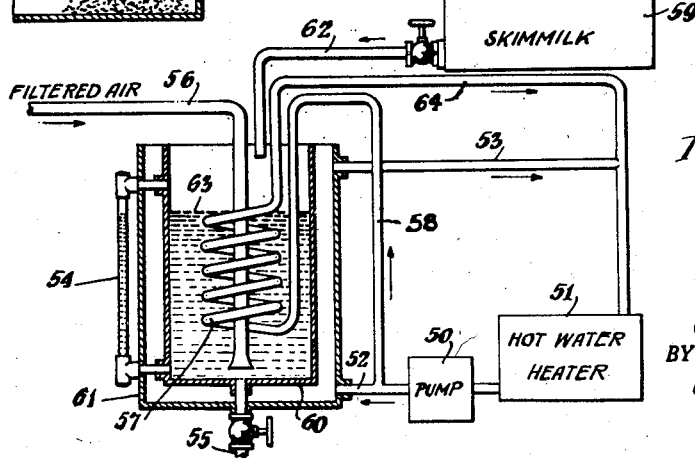
Fig. 4 illustrates diagrammatically a hot water-air blow type of concentrator suitable for practicing the invention.

Referring to Fig. 4, the structure of the preferred concentrator will now be described. The hot water-air blow type concentrator comprises an open top tank 60 having a suitable water jacket 61. The skim milk is fed into tank 60 from a suitable container 59 through supply pipe 62. The level of the skim milk is kept at level indicated by 63 by supplying additional skim milk as the water is evaporated. The milk level is observed by a glass 54. The concentrated skim milk is drawn off through outlet pipe 55.

Disposed within tank 60 is an air pipe 56 to which is connected a supply of filtered air generated by a suitable blower. The air pipe 56 opens up near the bottom of the tank so that air is blown into the bottom of the liquid suitably agitating the liquid and bubbling through it, escaping from the open top of the vessel.

Also located in the tank 60 is a hot water coil 57 having an inlet pipe 58 and outlet pipe 64. Inlet pipe 58 is supplied with hot water by a pump 50 receiving water from a hot water heater 51. Outlet pipe 64 leads back to the hot water heater. A connection 52 connects inlet pipe 58 with the water jacket 61 and a connection 53 connects the water jacket 61 with outlet pipe 64.

The hot water and milk pass through the pipes as indicated by the arrows. Hot water is circulated through the hot water coil 57 and through the water jacket 61 to keep the milk in the tank at the proper temperature, but without overheating it.

The process for preserving whole milk will now be described. The cold fresh whole milk, as it is obtained from the farmer, is first fed to a suitable cream separator for separating the whole milk into cream and skim milk. It is desirable to produce a cream having 40% butterfat by weight. This removes substantially all the butterfat from the milk. The cream is then transferred to a cream storage vat where it is pasteurized by any suitable pasteurizing process. The skim milk, from which substantially all the butterfat has been removed, is separately taken to any concentrating device for reducing, but not eliminating, the water content. The concentration is carried on preferably by a hot water-air blow concentrator shown in Fig. 4 where the skim milk is subjected to elevated temperature without cooking it.

Referring now to Fig. 4, the skim milk is led to tank 59 and thence to the hot water-air blow concentrator 60 through inlet pipe 62. The temperature of the hot water flowing through the jacket 61 and through coil 57 should not exceed about 170° F. so that the milk contacting the walls of the jacket and the hot water coil 57 will not become scorched or cooked. At the same time filtered air is fed into the concentrator through supply pipe 56 to impart turbulence to the milk and to evaporate water from the milk. Skim milk is added to concentrator 60 from time to time to maintain the liquid level at 63 to compensate for evaporation.

The apparatus is so designed and the method so conducted that the temperature of the milk in the concentrator 60 will be about 143° F. and the milk is held at this temperature for at least thirty minutes so that pasteurization is obtained at the same time the water content is being reduced.

The concentrated hot skim milk and hot cream, in the same relative proportions as they occurred in whole milk, are then re-mixed in a suitable mixing tank, after which the hot mixture is subjected to an intense and severe agitation to thoroughly emulsify the mixture by breaking up the fats and solids. Any suitable commercial homogenizing machine, such as a homogenizer or viscolizer, may be used. The term "homogenize" and its derivatives are used hereinafter and in the claims to describe this thorough emulsifying operation.

After the emulsifying operation, the hot concentrated homogenized milk, which may be at substantially 143° F., is fed directly to a quick freezing apparatus, as for example, into the pipe 12 in Fig. 1, the hopper 25 in Fig. 2, or the hopper 43 in Fig. 3. Or, the hot homogenized milk may be first cooled to room or tap water temperatures before subjecting it to the quick freezing operation in the above machines. In the event the hot milk is first cooled before subjecting to quick freezing, it is preferable that it then be fed to the quick freezing apparatus after cooling without undue delay since if the hot milk is cooled to below about 100° F. and allowed to stand, there is a tendency for the milk sugar to crystallize, forming undesirable large crystals.

In Fig. 1, the concentrated milk and cream is fed through a pipe 12 into the space between the cylinders as indicated, this mix being spread upon the cylinders in a thin layer and carried around as they rotate. Suitable refrigeration is applied inside the rotating drums 10 and 11 and the entire process may be carried out in a refrigerated room. The liquid milk quickly freezes in a thin layer on the surface of the drums where it is scraped off by scrapers 14 and 13, the scraped milk snow being collected by any desirable apparatus and compressed into cakes.

In Fig. 2, the batch of concentrated milk and cream is fed into the hopper 25 to charge the cylinder 20, after which feed valve 18 is closed. The scraper blades 23 continually expose the different parts of the mix to the cold refrigerated walls until the entire mix is frozen to the proper consistency. The overrun normally present when freezing ordinary ice cream is considerably reduced by minimizing the whipping action, by the omission of swelling agents and by freezing a little but more than ordinary ice cream.

When sufficiently frozen, the valve 27 is opened and the action of the helical scrapers 23 discharges the mix into the receptacle 28. The consistency of the discharged material may be about as thick as dough. The filled receptacle 28 may then be taken to the hardening room for further hardening under reduced temperature. The pre-freezing so sets the material that no further crystal growth takes place in the hardening room.

In Fig. 3 the concentrated milk and cream is fed into the feed hopper 43 and sufficient compressed air is supplied to pipe 44 to insure an even flow of the mix through the machine. The passage of the mix between pipes 40 and 41 in a very thin layer of say one-quarter inch in thickness quickly freezes the mix under pressure. The freezing is so rapid that the crystals formed are not much larger than moisture in air in the form of mist, making a very fine texture. By adjusting the amount of air, the overrun may be closely controlled so that the frozen product has little, if any, air added, insuring a product of maximum density. By the time the material reaches the discharge pipe 45 it is properly frozen and this material falls into a suitable container 46. The container 46 may then be taken to a hardening room for further hardening under reduced temperature. Due to the fine texture of the material, no further change in crystal structure takes place in the hardening room.

The quick freezing process spreads the concentrated mix into a large area subjecting small unit quantities to very low refrigerating temperatures. The temperature of the refrigerating apparatus may be as low as −40° F. to insure quick freezing of the product. The milk snow obtained from the apparatus of Fig. 1 may be in the form of a thin loose, frozen, dry powder. This may then be suitably compressed into cakes or bars. The frozen product obtained from the machines of Figs. 2 and 3, after being subjected to the cold room, may be suitably cut into cakes or bars of the suitable size.

The preferred temperature for pasteurizing the milk and cream is around 143° F. which is regarded as a good pasteurizing temperature. However, in some cases, the pasteurizing temperatures may run from as low as 140° F. to as high as 165° F.

The temperature of the quick freezing apparatus should be as low as −40° F. to insure the product being frozen with sufficient speed. It is desirable that the product quickly attain a temperature at least as low as −10° F., although in some cases it may be desirable to have the product quickly reach a somewhat lower temperature. In other cases, it may be sufficient for the temperature to reach zero F. quickly.

The cakes or bars may be of any standard size, depending upon the consumer demand. For example, the cakes or bars may be of such size that, when mixed with a predetermined amount of water, they will produce a half pint, pint, quart, gallon, etc. The cakes or bars may be formed in comparatively large sizes suitably grooved or divided so that parts of the desired size may be conveniently broken off.

The amount of water to be added by the consumer depends upon the amount of concentration in the concentrating step and may vary considerably. It should be borne in mind that the more water eliminated in the concentration step, the more water will naturally have to be replaced by the consumer to get a true reconstituted whole milk. The amount of water eliminated will depend upon commercial considerations.

In practice, the amount of concentration of skim milk may run from a ratio as small as 2½ to 1 to a ratio as high as 4 to 1. The concentration ratio is defined as the ratio by volume of a given amount of skim milk before concentration to the volume occupied by that milk after concentration.

In reconstituting the milk, it is desirable, for simplicity, that the proportions of water to be added to the frozen product be whole numbers and not fractions. For example, it is desirable that the concentration be such that it is only necessary for the consumer to add, say, two parts of water by volume for each part by volume of frozen product. To obtain a frozen product requiring such a proportional addition of water, it is necessary that the concentration ratio of skim milk be approximately 3.86 to 1. This ratio is based upon a whole milk testing approximately 3.8% fat by weight and allows for change in volume of the frozen product due to freezing and compressing.

Consider for example a run of 360 quarts (9 cans) of whole milk containing 3.8% butterfat content by weight. This quantity of such milk contains about 29.05 lbs. of butterfat or about 36 quarts. Subtracting the 36 quarts of cream from the 360 quarts of whole milk, we have 324 quarts of skim milk. Concentrating the skim milk in a ratio of 3.86 to 1 gives about 84 quarts of concentrated skim milk. Adding the 36 quarts of cream and the 84 quarts of concentrated skim milk, we have 120 quarts of mixed milk and cream to be subjected to the homogenizing and quick freezing process above described. It will be noted that the original 360 quarts of whole milk bears a volume ratio of 3 to 1 to the 120 quarts of remixed product.

The frozen cakes or bars may be marked or otherwise indicated according to the number of parts of water by volume to be added to each part of frozen product. Or, the frozen products may indicate the amount in liquid measure of reconstituted whole milk which can be made from the particular bar or part thereof so that it is only necessary for the consumer to place a cake or part thereof in a container of the indicated liquid measure and fill with water.

It will be understood that the frozen product may be compressed in any desirable shape and shipped in any desirable container. For example, the frozen product may be shipped in small cartons of convenient size to fit into the freezing compartment of a household mechanical refrigerator. It is obvious also that the consumer may add any lesser amount of water than that necessary to provide reconstituted whole milk and obtain a heavier product corresponding, for example, to fresh condensed milk or whipping or coffee cream.

Thus, there is provided a preserved milk in frozen, concentrated, form which, when mixed with water, forms a reconstituted whole milk which has all the flavor, body, appearance, consistency and digestability of original fresh natural whole milk.

The separation of cream of high butterfat content prior to the concentrating step preserves the volatile light oils and flavors which would be lost if the cream were subjected to the concentrating process. At the same time, the use of a hot water-air blast type of concentrator, no part of which has a temperature higher than 170° F., prevents cooking or scalding the skim milk even briefly and thus does not caramelize any of the milk sugar or boil any of the proteins.

The homogenizing of the milk and cream while hot thoroughly breaks up the fats and solids into extremely fine particles and the solid particles become encased in fat, which prevents any change in their form, so that on dissolving in water, the solids stay in suspension readily and there is no tendency to form fine curds, or for the fat to clump.

The immediate cooling of the homogenized mixture to room temperature and the immediate freezing prevents the milk from thickening and the milk sugar from crystallizing. The quick freezing of the homogenized product prevents the growth of large crystals so that, when the frozen product dissolves, it mixes readily with the water, forming a good colloidal suspension having appearance and taste entirely like the original whole milk.

Thus a method of preserving milk products has been described which preserves the product without affecting the flavor or digestability. Due to the elimination of, roughly, two-thirds of the water, great saving in space and weight is effected, which is important for transportation and storage. Due to the fact that the product is frozen, inexpensive containers, such as waxed cartons may be used. Due to the wide distribution and sale of ordinary frozen food products, the frozen milk products can be distributed and sold without difficulty since the same distributing apparatus and technique may be used for the frozen milk products, as with other frozen food products now on the market.

While certain novel features of the invention have been disclosed and are pointed out in the annexed claims, it will be understood that various omissions, substitutions and changes may be made by those skilled in the art without departing from the spirit of the invention.

What is claimed is:

1. The method of making a frozen whole milk product from which a reconstituted whole milk may be made by adding water, said method comprising separating fresh whole milk into cream and skim milk, subjecting the cream to a sufficiently high temperature to pasteurize it without removing volatile matter, subjecting the skim milk to pasteurizing temperature to reduce the water content in a concentration ratio by volume of between 2½ to 1 and 4 to 1, homogenizing the hot concentrated milk and cream together to break up the solids, reducing the temperature of the homogenized mixture to normal room on tap water temperature and subjecting the mixture without substantial delay to a sufficiently low temperature to quickly bring the mixture to a temperature of between zero and —40° F. to form the frozen whole milk product.

2. The method of making a frozen whole milk product from which a reconstituted whole milk may be made by adding water, said method comprising separating fresh whole milk into cream and skim milk, separately pasteurizing the cream, contacting the skim milk with a surface having an applied temperature not exceeding about 170° F. while blowing a column of air in contact with the skim milk for a period of at least 30 minutes to pasteurize the skim milk and to reduce the water content to less than one-half by volume, remixing the pasteurized cream and concentrated skim milk, homogenizing the hot milk mixture to break up the fats and solids and to cause the solid particles to become encased in fat, immediately reducing the temperature of the homogenized mixture to tap water or normal room temperature, quick-freezing the mixture without further delay to obtain a frozen concentrated whole milk, and forming said frozen concentrated whole milk into shapes.

3. The method of making a frozen whole milk product from which a reconstituted whole milk may be made by adding water, said method comprising separating fresh whole milk into cream and skim milk to produce a cream of about 40% butterfat content by weight, separately pasteurizing the cream, contacting the skim milk with a water heated surface of an open top concentrator whose water has a temperature not exceeding about 170° F., while blowing a column of air through the skim milk for a period of at least 30 minutes to pasteurize the skim milk and to reduce the water content so that the volume of the skim milk before concentration to the volume after concentration bears the ratio of between 2½ to 1 and 4 to 1, remixing the pasteurized cream and concentrated skim milk, homogenizing the hot milk mixture to break up the fats and solids and to cause the solid particles to become encased in fat, reducing the temperature of the homogenized mixture from above about 100° F. to normal room or tap water temperature without delay, quick-freezing the mixture without further delay to quickly bring the mixture to a temperature of between zero and minus 40° F. to obtain a frozen concentrated whole milk, and forming said frozen concentrated whole milk into shapes.

4. The method of making a frozen whole milk product from which a reconstituted whole milk may be obtained by adding water, said method comprising separating fresh whole milk into cream and skim milk, pasteurizing the cream, separately concentrating the skim milk to reduce substantially the water content, mixing the said pasteurized separated cream and said contrated separated skim milk, homogenizing the re-mixed milk, and quick-freezing the re-mixed homogenized milk to form the frozen whole milk product.

CHARLES BRUNKHURST.